Patented Sept. 19, 1950

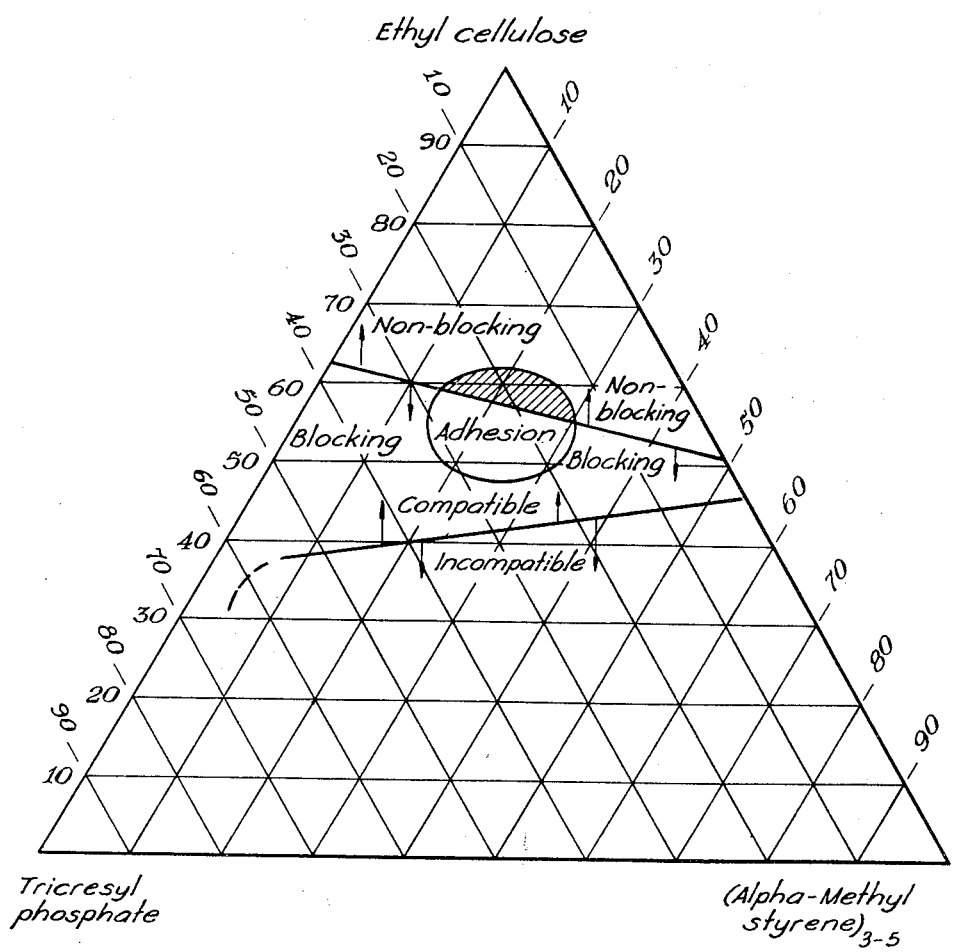

2,523,203

UNITED STATES PATENT OFFICE 2,523,203

NONBLOCKING, HEAT-SEALING ETHYL CELLULOSE COATING COMPOSITION AND A WRAPPING SHEET COATED THEREWITH

Robert C. Ernst and William B. Moore, Jr., Louisville, Ky., assignors to The Dow Chemical Company, Midland, Mich., a corporation of Delaware Application October 28, 1948, Serial No. 57,004

3 Claims. (Cl. 106—177)

This invention relates to a new and useful coating composition, particularly adapted to be applied to regenerated cellulose or aluminum foil from lacquer solutions to give a coated foil which is non-blocking and which is readily heat-sealable to paper, glassine paper, regenerated cellulose foil, metal foil, and similar packaging materials. It relates, as well, to the heat-sealable, non-blocking sheets coated with the new composition.

The most commonly employed wrapping materials are paper (in any of several forms), regenerated cellulose sheet, and metal foil. None of these is thermoplastic, and, in their natural forms they cannot be used in wrapping processes where the seal is generated by application of moderate heat and pressure. Instead, liquid adhesives are commonly used. Alternatively, special thermoplastic coatings are applied to one or both sides of these common wrapping sheets to render the sheet sensitive to heat and pressure and to facilitate the desired rapid and simple heat-sealing operation. Any coating so-employed, to be acceptable, must meet several tests. It must be insensitive to the temperatures which may be encountered in storage and shipment, so that, under the pressure existing in the stack or roll in which it is stored, the coating on one layer will not adhere to the coated or uncoated adjacent layer. A coated sheet which meets this requirement, under standard test conditions, is said to be non-blocking. It must be able to form strong seals with the same or other types of wrapping materials at temperatures which are available at the point of intended use and which will not injure the package contents, and under moderate pressures which will not deform the package. Any coating so-employed, especially if used on metal foil or on regenerated cellulose sheet, may be required to be transparent and free from haze. Of the materials so-employed heretofore, many have been waxy compositions whose seals have no strength, others have been based on nitrocellulose, which presents a fire hazard, and some have been vinyl chloride copolymers which cannot be used with full satisfaction on metal foil because of their gradual liberation of corrosive hydrogen chloride.

It is an object of the present invention to provide a non-blocking, heat-sealable composition for the suggested use, which is clear, transparent, inert to paper, glassine, regenerated cellulose and metal foil, and is neutral in reaction, presents little or no danger of combustion, and is not adversely affected on ageing or when exposed to freezing temperatures.

Our specific solution to the problem is found to reside in a small group of quaternary compositions, which are represented by the shaded area in the accompanying drawing. The single figure of said drawing presents graphically the properties of coatings deposited from lacquer solutions in which the non-volatile coating materials are ethyl cellulose, tricresyl phosphate and a liquid consisting of one or more of the trimer, tetramer and pentamer of alpha-methyl styrene, together with 0.1 to 0.2 per cent of carnauba wax.

Only relatively few compositions of the stated constituents are useful for the stated purpose. Thus, all those compositions having less than about 40 per cent ethyl cellulose either are incompatible and do not form homogeneous coatings or are too soft and tacky to be useful here. Of the remaining, compatible compositions, only a small group, represented on the drawing by the ellipse, form coatings which give strong heat seals. The area enclosed by the ellipse includes generally the compositions of about 48–63 per cent ethyl cellulose, 13–32 per cent tricresyl phosphate and 13–32 per cent trimer to pentamer of alpha-methyl styrene, with 0.1 to 0.2 per cent carnauba wax. Of this small group of compositions, less than half may be used satisfactorily for the intended purpose, as the others give blocking coatings. The useful compositions are represented by the shaded area on the drawing, and contain (as limited by said shaded area) not less than 54 nor more than 63 per cent ethyl cellulose, not less than 13 nor more than 27 per cent tricresyl phosphate, not less than 13 nor more than 31 per cent liquid trimer to pentamer of alpha-methyl styrene, and 0.1 to 0.2 per cent carnauba wax.

The named constituents of the coating composition are dissolved to form a solution of the desired coating viscosity in a volatile common solvent, which may be a mixture of 60 to 80 parts toluene and 40 to 20 parts ethanol, by volume, and may contain other lacquer solvents, such as xylene, amyl acetate, and the like. The concentration of non-volatile coating constituents in the solution is adjusted according to standard practice to give the solution a viscosity which is appropriate for the intended coating method. Thus, spray coating, brushing, roller coating and doctoring each have different and well known viscosity requirements which can be met by adjusting the ratio of solvent to solute in the lacquer. After the constituents of the new lacquer are mixed, it is preferable to heat them briefly to at least 80° C. to insure solution of the carnauba wax.

The ethyl cellulose used may be any ethyl cellulose of at least 45 per cent ethoxyl content which is soluble in organic solvents. The liquid low molecular weight polymers of alpha-methyl styrene are the trimer, tetramer and pentamer, and mixtures thereof, obtainable by mixing and heating monomeric alpha-methyl styrene at 50° to 150° C. with a condensation catalyst, such as 70 to 80 per cent sulfuric acid, or phosphoric acid, or acid-activated bleaching earth, or antimony chloride. These low polymers commonly have viscosities in the range from 600 to 2000 centipoises at 60° C.

Coatings deposited from the above-described solutions are adherent to aluminum foil, and regenerated cellulose foil, as well as to the more porous paper wrapping sheets. The deposited coatings are flexible, even after repeated exposure to freezing temperatures. The coated sheets are non-blocking when stacked either face-to-face with other coated sheets or face-to-back with such sheets, or with the coated face in contact with uncoated metal foil, regenerated cellulose foil or paper. The blocking test is made under 1 pound pressure over a square inch area at 50° C. for 24 hours. The coated surfaces may be heat-sealed to similar or dissimilar wrapping sheets under moderate pressure at 135° to 150° C., and the strength of the seal increases with the pressure applied at the time the seal is made. Hot seals which are promptly chilled, e. g. to about 10° C., are stronger than those which are not. A coating thickness of 0.4 mil is sufficient for most purposes, and thinner coatings of the order of 0.18 to 0.2 mil may be used successfully on regenerated cellulose sheets.

The following examples illustrate some of the preferred compositions and the way in which they may be used.

Each of several compositions falling in the "compatible" range in the annexed drawing were dissolved in 7 milliliters of a 70-30 volume mixture of toluene and ethanol for each gram of mixed solute. Aluminum foil was coated with each of the solutions, which had first been heated to insure solution of the wax, and then cooled. The coatings were applied by a coating roller and, when dry, were about 0.3 mil thick. The coated sheets were given the block test with the following typical results.

| Film Composition, Per Cent by Weight | | | | Block |
|---|---|---|---|---|
| Ethyl Cellulose | Tricresyl Phosphate | Alpha-Methyl Styrene Polymer | Carnauba Wax | |
| 1  60 | 24.8 | 15 | .20 | No. |
| 2  60 | 14.8 | 25 | .20 | Yes. |
| 3  55 | 34.8 | 10 | .20 | No. |
| 4  55 | 14.8 | 30 | .20 | No. |
| 5  50 | 19.8 | 30 | .20 | Yes. |

Aluminum foil, coated with the fourth composition listed in the foregoing table, was heat sealed to a coextensive regenerated cellulose sheet, and the resulting "laminate" was subjected repeatedly to the temperatures at which foods are frozen and stored, without losing flexibility and without weakening the bond between the sheets.

When two or more flexible sheets are sealed together, at points of overlap, by first coating the sheets with the present compositions and then applying heat and moderate pressure thereto, a seal is obtained which may be made from 8 to 12 per cent stronger by chilling the sealed area to about 10° C. promptly after the heat-sealing operation.

These and other similar tests confirm the fact that, only with those compositions represented by the shaded area of the drawing is there found both the necessary adhesion to the foil base and the required freedom from blocking. The coated sheets show no adverse effect of ageing upon their appearance, flexibility, strength of seal or ability to form seals.

The unique compositions of the invention form clear, haze-free coatings which exhibit no odor and contribute no flavor to foods or other sensitive materials packed in wrappers bearing the compositions.

We claim:

1. A non-blocking, thermally adhesive coating composition consisting essentially of ethyl cellulose, tricresyl phosphate, of a liquid consisting of the trimer to pentamer of alpha-methyl styrene, all in proportions represented by the shaded area on the annexed drawing, and, from 0.1 to 0.2 per cent of carnauba wax.

2. A heat-sealable, non-blocking wrapping sheet consisting of aluminum foil coated with the composition of claim 1 in a thickness of 0.18 to 0.4 mil.

3. As an article of manufacture, a wrapping sheet coated with the composition of claim 1 in a thickness of 0.18 to 0.4 mil, said article being flexible, heat-sealing and non-blocking.

ROBERT C. ERNST.
WILLIAM B. MOORE, JR.

REFERENCES CITED

The following references are of record in the file of this patent:

UNITED STATES PATENTS

| Number | Name | Date |
|---|---|---|
| 1,907,520 | Dreyfus | May 9, 1933 |
| 2,217,171 | Kumnick et al. | Oct. 8, 1940 |
| 2,394,101 | Phillips | Feb. 5, 1946 |

FOREIGN PATENTS

| Number | Country | Date |
|---|---|---|
| 151,978 | Switzerland | Jan. 15, 1932 |
| 427,864 | Great Britain | May 1, 1935 |
| 497,001 | Great Britain | Dec. 6, 1938 |
| 506,290 | Great Britain | May 25, 1939 |
| 511,580 | Great Britain | Aug. 21, 1939 |

Certificate of Correction

Patent No. 2,523,203                      September 19, 1950

ROBERT C. ERNST ET AL.

It is hereby certified that error appears in the printed specification of the above numbered patent requiring correction as follows:

Column 3, in the table, last column thereof, opposite "2", for "Yes" read *No*; same column, opposite "3", for "No" read *Yes*; column 4, line 31, for the word "of", first occurrence, read *and*;

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*